United States Patent [19]
Davis

[11] Patent Number: 5,862,393
[45] Date of Patent: Jan. 19, 1999

[54] SYSTEM FOR MANAGING POWER OF A COMPUTER WITH REMOVABLE DEVICES

[75] Inventor: Brett Allen Davis, Duluth, Ga.

[73] Assignee: LXE, Inc., Norcross, Ga.

[21] Appl. No.: 727,715

[22] Filed: Oct. 7, 1996

[51] Int. Cl.$^6$ .................................. G06F 1/32; G06F 1/26
[52] U.S. Cl. ............................... 395/750.01; 395/750.03; 395/750.05; 395/750.06; 395/282
[58] Field of Search .................... 395/750.01, 750.02, 395/750.05, 750.06, 282

[56] References Cited

U.S. PATENT DOCUMENTS

| | | |
|---|---|---|
| 4,835,737 | 5/1989 | Herrig et al. . |
| 5,167,024 | 11/1992 | Smith et al. . |
| 5,204,964 | 4/1993 | Bowden, III et al. . |
| 5,230,074 | 7/1993 | Canova Jr., et al. . |
| 5,237,692 | 8/1993 | Raasch et al. . |
| 5,239,652 | 8/1993 | Seibert et al. . |
| 5,304,987 | 4/1994 | Brunson et al. ......................... 340/654 |
| 5,319,751 | 6/1994 | Garney ..................................... 395/200 |
| 5,367,697 | 11/1994 | Barlow et al. . |
| 5,379,437 | 1/1995 | Celi Jr., et al. . |
| 5,408,668 | 4/1995 | Tornai . |
| 5,410,712 | 4/1995 | Okuno . |
| 5,410,714 | 4/1995 | Yorimoto et al. . |
| 5,412,798 | 5/1995 | Garney ..................................... 395/500 |
| 5,440,748 | 8/1995 | Sekine et al. . |
| 5,467,469 | 11/1995 | Saito et al. . |
| 5,475,271 | 12/1995 | Shibasaki et al. . |
| 5,477,476 | 12/1995 | Schanin et al. . |
| 5,486,726 | 1/1996 | Kim et al. ................................ 307/120 |
| 5,491,804 | 2/1996 | Heth et al. .............................. 395/275 |
| 5,501,534 | 3/1996 | Mizoguchi . |
| 5,504,909 | 4/1996 | Webster et al. ......................... 395/750 |
| 5,511,013 | 4/1996 | Tokieda et al. . |
| 5,546,590 | 8/1996 | Pierce ...................................... 395/750 |
| 5,560,022 | 9/1996 | Dunstan et al. ........................ 395/750 |
| 5,560,024 | 9/1996 | Harper et al. ........................... 395/750 |
| 5,589,719 | 12/1996 | Fiset ........................................ 307/131 |
| 5,606,704 | 2/1997 | Pierce et al. ............................. 395/750 |
| 5,655,148 | 8/1997 | Richman et al. ....................... 395/828 |
| 5,671,368 | 9/1997 | Chan et al. .............................. 395/282 |
| 5,727,221 | 3/1998 | Walsh et al. ............................. 395/750 |
| 5,754,869 | 5/1998 | Holzhammer et al. ............ 395/750.01 |
| 5,754,870 | 5/1998 | Pollard et al. ..................... 395/750.05 |
| 5,758,171 | 5/1998 | Ramamurthy et al. ............ 395/750.01 |
| 5,784,628 | 7/1998 | Reneris ............................. 395/750.01 |

OTHER PUBLICATIONS

"Miniature Card Specification" Intel Corporation, Jul. 29, 1996, Release 1.1.

"Advanced Power Management" (APM), BIOS Interface Specification, Intel Corporation and Microsoft Corporation, Sep. 1993, Revision 1.1.

*Primary Examiner*—Meng-Ai T. An
*Assistant Examiner*—Valerie Darbe
*Attorney, Agent, or Firm*—Jones & Askew LLP

[57] ABSTRACT

A system for managing power consumption of a computer by communicating power management events to a removable device of the computer. A device removal signal is transmitted to a device controller for the removable device in response to a power management event and while the device is installed within a socket of the computer. This device removal signal can provide notice of a power state change for the device, such as the interruption of electrical power to that device. This power state change is communicated by the device controller to a device driver in response to the device removal signal. Electrical power to the device is terminated in response to the power management event. A device insertion signal is transmitted to the device controller in response to another power management event and while the device remains installed within the socket. This device insertion signal provides notice of another state change for the device. Electrical power is reapplied to the device in response to this power management event. In addition, the device is configured by supplying device information from the device driver to the device in response to the device insertion signal and after electrical power is applied to the device.

13 Claims, 4 Drawing Sheets

SYSTEM FOR MANAGING POWER OF A COMPUTER WITH REMOVABLE DEVICES

FIELD OF THE INVENTION

This present invention relates generally to a power management system for a computer, and more particularly relates to a system for managing the consumption of electrical power by a computer employing removable devices requiring configuration information in response to interruption of electrical power.

BACKGROUND OF THE INVENTION

Power consumption in a computer system or a data processing device presents a significant design issue for hardware and software developers in the computing industry. The popularity of so-called lap-top or notebook portable computers, which typically can operate on battery power, has emphasized the need for a power management system that reduces the use of electrical power. A power management system typically operates to conserve electrical power consumption by reducing power requirements in response to a detected lack of activity by a computer or its devices. By reducing power consumption when a computer or its devices are not in use, the cost for a user to power a computer is reduced and electrical power generation resources are conserved.

A typical power management system is a computer monitoring power-conservation system that detects activity at the computer by monitoring for computer input activity. The computer can enter a reduced power state upon detection of inactivity for a predetermined time period. For example, the computer can enter a reduced power state upon detection of a period that the user fails to input data, thereby resulting in the powering down of selected computer devices. The computer can resume normal operation by restoring power to required devices in response to activity by the user, such as keyboard or mouse input. It will be appreciated that this type of power management system effectively reduces power consumption by the computer during long intervals of inactivity, such as "after hours" or idle time power consumption by a computer in a business or home environment.

A power management event typically comprises either a power-down or power-up event. A sequence of power-down and power-up events can cause a computer device to enter a default state or a random state based on the loss of configuration information. It is often necessary to supply configuration information to a device via its device driver in response to a sequence of power-down and power-up events. This suggests a need for communicating power management events to a device driver for a device affected by a power transition to support this transfer of device configuration information.

The need for reconfiguring a device in response to a power management event has been addressed at the operating system-level by the use of an "Advanced Power Management" (APM)-aware device driver. These drivers provide a power management software interface for peripheral devices of a computer that is compatible with the APM system, which is defined by the APM BIOS interface specification, Revision 1.1, September 1993, distributed by Intel Corporation and Microsoft Corporation. An APM driver can manage power levels via function calls to an APM software interface and an APM BIOS manages power in the background based on device activity. In this manner, the consumption of power by devices can be managed either by the system BIOS or by the operating system. Significantly, a device driver must be APM-compatible to operate within the APM system and to supply configuration information to its device in response to a power management event. In other words, a conventional device driver that does not conform to the APM system specification may fail to respond to a power management event, thereby resulting in the loss of device configuration for the corresponding device.

In view of the foregoing, there is a need for alternative mechanisms to achieve the desirable objective of power management of devices that use conventional device drivers, i.e., non-compatible APM system drivers. This need typically arises in computer systems using removable devices, such as PCMCIA or PC Card devices that can be easily connected or removed from a compatible socket of the computer system. Similar to a sequence of power management events, power for a removable device is typically interrupted in response to a device removal event, and restored in response to a device insertion event. Conventional device drivers for this type of removable device, however, generally are not compatible with the APM system. These removable devices can lose device configuration information in response to a power-down/power-up sequence in the absence of an appropriate power management system. Indeed, if the power management event is not communicated to the device driver, the only way to return a device that has lost its device configuration to a useful state is to restart or re-boot the computer system. The present invention solves these issues by using the device removal and insertion signals normally generated by the removal or insertion of a device to support a power management application and to advise a driver for a device about a power management event.

SUMMARY OF THE INVENTION

The management of electrical power consumed by devices that use conventional device drivers presents a challenging design task because of the need for communicating power management events to these device drivers. For example, a device can lose device configuration information in response to a power-down/power-up sequence if the driver is not advised of power management events because the driver is unaware of the need to reconfigure the device. Although prior solutions have focused on the use of an "intelligent" power management system implemented as part of an operating system, conventional device drivers are generally are not compatible with this operating system solution.

For removable devices, a device removal signal is normally generated in response to removing a device from its corresponding socket, i.e., a device removal event. The device removal signal serves to advise the device controller, which supports operation of the device within a computer, about the disconnection of the device from its socket. In response, the controller can notify the device driver for the device about the device removal operation, and can terminate electrical power distributed to the socket. Likewise, a device insertion signal is normally generated in response to inserting a device into a socket, i.e., a device insertion event. The device insertion signal serves to advise the device controller about the insertion of the device, thereby prompting the distribution of electrical power to the socket for that device. The controller also can advise the device driver for that device about the insertion operation, thereby prompting the device driver to supply device configuration information to that device, as required.

The present invention provides an inventive solution to power management by taking advantage of the known characteristics of device removal and insertion signals to communicate power management events to a device driver loaded for operation with that device. A power management application can be achieved by manipulating the use of these signals while a device remains properly connected to a socket. A device removal signal can be used to prompt a device controller to advise a device driver about a power-down event, and a device insertion signal can be used to prompt the device controller to advise the device driver about a power-up event. This supports a power management system that uses conventional device drivers, which are readily available for use with corresponding devices, without modification or revision of these drivers.

To achieve the desired power management function, it is often necessary to cause a removable device to enter a reduced power state when a device is inactive or placed in the idle state. To fully use that device once power is restored, it is necessary to reconfigure the device with device configuration information. Specifically, it is desirable to communicate configuration information to a device via its device driver in response to restoring power. The present invention can notifying the appropriate device driver of a power management event and by supplying device configuration information to a corresponding device in response to the restoration of power.

For the present invention, a device removal signal can be transmitted to a device controller for the removable device in response to a power management event and while the device is installed within a socket of the computer. A device removal signal is normally generated for a device removal event, thereby prompting the interruption of power to the corresponding device. In response to this "apparent" device removal event, electrical power is terminated for the socket associated with the removable device, and a power-down event is achieved. The device controller responds to the device removal signal by communicating this power state change to a device driver for the device.

A device insertion signal can be transmitted to the device controller in response to another power management event and while the device remains installed within the socket. A device insertion signal is normally generated for a device insertion event, thereby prompting the restoration of power to the corresponding device. In response to this "apparent" device insertion event, electrical power is reapplied to the device, and a power-up event is achieved. In addition, the device is configured by supplying device information from the device driver to the device in response to the device insertion signal and after electrical power is applied to the device.

More particularly described, the present invention can support a system for managing electrical power distributed to a PCMCIA device compatible with a corresponding socket or receptacle of a computer system. The device removal signal is normally generated in response to removing the PCMCIA device from the PCMCIA socket. Similarly, the device insertion signal is normally generated in response to inserting the PCMCIA device into the PCMCIA socket. For this aspect of the present invention, the device removal signal is transmitted to a controller of the PCMCIA socket in response to a power management event and while the PCMCIA device is installed with the PCMCIA socket. This effectively provides an indication that power will be removed from the PCMCIA device. A removal advisory signal, is transmitted from the controller to a device driver for the PCMCIA device in response to the device removal signal. The device driver, responsive to the removal advisory signal, preserves device configuration information for the PCMCIA device. The PCMCIA device can lose its device configuration in response to a power termination event.

The device insertion signal is transmitted to the controller of the PCMCIA socket in response to another power management event and while the PCMCIA device remains installed with the PCMCIA socket. The device insertion signal effectively provides an indication that power will be applied to the PCMCIA device. An insertion advisory signal is transmitted from the controller to the device driver for the PCMCIA device in response to the device insertion signal. This prompts the device driver to configure the PCMCIA device by supplying device configuration information to the PCMCIA device after electrical power is reapplied to the PCMCIA device.

The device removal signal is generated in response to a power management event corresponding to interruption of electrical power to the PCMCIA device. A pair of card detect lines, connected between the controller and the PCMCIA device, are normally set to a logical low level in response to insertion of the PCMCIA device into the socket and to a logical high level in response to removal of the PCMCIA device from the socket. By opening one of the card detect lines while the PCMCIA device remains connected to the socket, the logical low level signal is interrupted and the controller instead receives a logical high level signal. Although the device remains installed within the socket, the controller treats this logical high level as a device removal signal, and responds by communicating with the device driver for the PCMCIA device. In this manner, the driver is advised of a power-down event by the use of the conventional communications arising between a device controller and device driver for a device removal event.

The device insertion signal is generated in response to a power management event corresponding to the restoration of electrical power to the PCMCIA device. By restoring the signal path between the device and the device controller, typically by reconnecting the signal carried by the card detect lines to the controller, the logical low level is again applied to the controller because the PCMCIA device remains connected to the socket. The controller treats this transition from logical high level to logical low level as a device insertion signal, and responds by communicating with the device driver for the PCMCIA device. In this manner, the driver is advised of a power-up event based on the use of the conventional communications arising between a device controller and device driver for a device insertion event. The driver can restore device configuration by supplying device configuration to the PCMCIA device.

DETAILED DESCRIPTION

The present invention is directed to a system for managing power consumed by a computer using a removable device, such as a PCMCIA device or a PC Card device, which can be connected to a computer or computer-implemented system via a socket or receptacle. The present invention provides the advantage of supporting a power management system for a computer that uses conventional device drivers, rather than power management-modified drivers, to communicate with the with the removable devices of the computer system. This advantage is achieved by using the known signals, normally generated in response to a device insertion or device removal event, for power management rather than for conventional device and socket communications.

To achieve the desired power management function, it is often necessary to cause a removable device to enter a reduced power state when a device is inactive or placed in the idle state. However, a device will often lose its device configuration information in response to powering down that device. To fully use that device once power is restored, it is necessary to reconfigure the device with device configuration information. Specifically, it is desirable to communicate configuration information to a device via its device driver in response to restoring power. The present invention provides a solution to this problem by notifying the appropriate device driver of a power management event and by supplying device configuration information to a corresponding device in response to the restoration of power. This solution is achieved without the need for obtaining a device driver or a BIOS that is compatible with the advanced power management (APM) system defined by the APM BIOS interface specification prepared by Intel Corporation and Microsoft Corporation.

The detailed description which follows is represented largely in terms of processes and symbolic representations of operations by conventional computer components, including a processing unit or processor, memory storage devices, peripheral devices, and input devices, such as a mouse or keyboard. The processes and operations performed by the computer include the manipulation of electrical signals by a processor, and the maintenance of these signals with data structures resident in one or more memory storage devices. These data structures impose a physical organization upon the collection of information, such as data bits, stored within a memory storage device and represented by specific electrical or magnetic elements. These symbolic representations are the means used by those skilled in the art of computer programming and computer architecture to most effectively convey teachings and discoveries to others skilled in the art.

For the purposes of this discussion, a process is generally viewed as a sequence of computer-implemented steps leading to a desired result. These steps generally require manipulations of physical quantities. Usually, though not necessarily, these quantities take the form of electrical, magnetic, or optical signals capable of being stored, transferred, combined, compared, copied, or otherwise manipulated. It is conventional for those skilled in the art to refer to the signals as bits, bytes, values, elements, symbols, characters, instructions, commands, records, object, images, files, or the like. It should be kept in mind, however, that these and similar terms should be associated with appropriate physical quantities for computer operations, and that these terms are merely conventional labels applied to physical quantities that exist within and during operation of the computer.

In addition, it should be understood that the processes, programs, layers, routines, and devices described herein are not limited to any particular type of computer, nor are they related or limited to any particular computer architecture. Rather, various types of general purpose computing machines may be used with program modules constructed in accordance with the teachings described herein. Similarly, it may prove advantageous to construct a specialized apparatus to perform the operations described herein by way of a dedicated computer having a specified architecture with hard-wired logic or program stored in non-volatile memory, such as read only memory (ROM).

Figure 1:
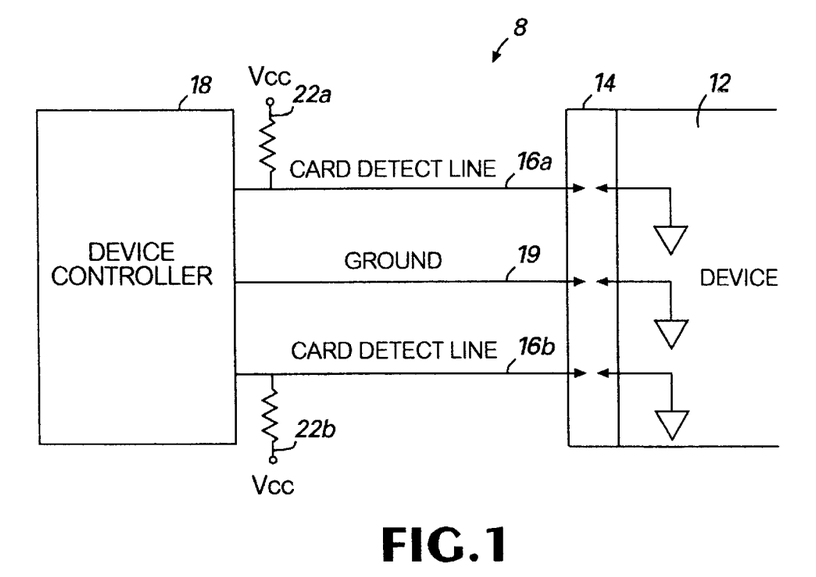
FIG. 1 is a block diagram of an interface for a conventional removable device of a system.

Referring now to the drawings in which like numerals represent like elements throughout the several figures, the present invention and the preferred operating environment will be described. FIG. 1 is a block diagram that illustrates an interface system for connecting a removable device to a socket of a computing system. Turning now to FIG. 1, a device 12, such as a peripheral board or "card", is connected to a computer 8 via a socket 14. Once connected, a pair of card detect lines 16a and 16b connect the device 12 to a device controller 18. In addition, a ground path 19 extends between the ground potential of the device 12 and to the card controller 18. Pull-up resistors 22a and 22b are located at the controller-side of the card detect lines 16a and 16b. Each pull-up resistor 22a and 22b is connected between a power source ($V_{cc}$) and a card detect line, thereby placing a logical high level on the card detect line when a device 12 is not connected to the socket 14. Although the pull-up resistors 22a and 22b are shown in FIG. 1 as discrete resistive components, those skilled in the art will appreciate that the pull-up resistors can be implemented as devices internal to the device controller 18. A ground potential is located at the device side of the card detect liner 16a and 16b, thereby placing a logical low level on both card detect lines when the device 12 is properly connected to the socket 14. In response to connecting the device 12 to the socket 14, the logical high-level signal present on each card detect line 16a and 16b transitions to a logical low level.

The state of the card detect lines 16a and 16b can be used by the device controller 18 to determine if a device 12 is connected to the socket 14. The device controller 18 determines that a device 12 is connected to the socket 14 when both card detect lines 16a and 16b transition from the logical high level to the logical low level. In contrast, in the event that one of the card detect lines 16a and 16b transitions from the logical low level to the logical high level, then the device controller 18 determines that a device 12 has been removed from the socket 14. In summary, a device insertion event is defined by a particular state for both of the card detect lines 16a and 16b, preferably each card detect line carrying a logical low level signal. A device removal event, however, is preferably defined by one of the card detect lines 16a and 16b transitioning to the logical high level. Those skilled in the art will appreciate that the removable device interface system described above is compatible with the standard specification for PCMCIA or PC Card devices.

The device controller 18 is responsible for controlling the operations of the device 12 with the computer system 8. In response to determining whether the device 12 is connected to the socket 14, the controller 18 can communicate this information to appropriate components of the computing system 8, including each device driver loaded for operation with the device 12. The device controller 18 also can terminate the distribution of electrical power to the socket 14, thereby interrupting the passage of electrical power at this receptacle. Similar operations can be conducted by the device controller 18 in response to detection of a device insertion event. Specifically, the device controller 18 can respond to a device insertion event by restoring power to the socket 14 and by advising an assigned driver about the device insertion event. This communication between the controller 18 and the device driver for the device affected by the removal/insertion sequence supports the exchange of device configuration information between the device driver and the device and is compatible with the standard specification for PCMCIA and PC Card devices.

Figure 2:
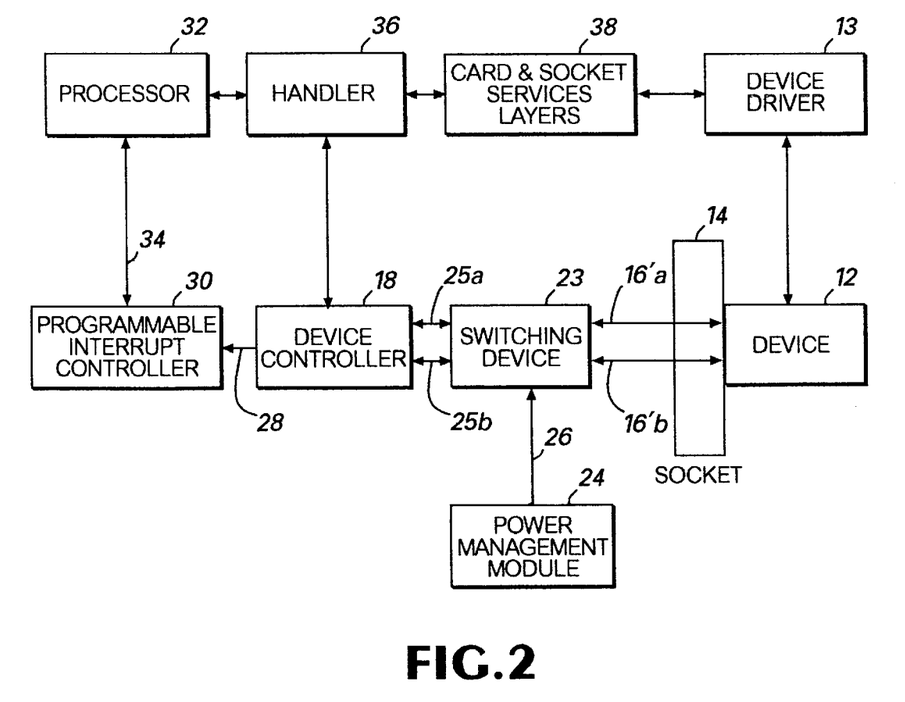
FIG. 2 is a block diagram showing the components for an embodiment of the present invention.

FIG. 2 is a block diagram illustrating the components for an embodiment of the present invention. Referring now to FIG. 2, a switching device 23 is connected between the device 12 (via the socket 14) and the device controller 18. Specifically, the switching device 23 is connected to the socket 14 (and, if inserted, the device 12) by the card detect lines 16a' and 16b'. In addition, the switching device 23 is connected to the device controller 18 via the system advisory lines 25a and 25b. A power management module 24, which supports the power management function by controlling the power states of the computer and its devices, communicates with the switching device 23 via a control line 26. The control line 26 carries control signals output by the power management module 24 for controlling the operating state of the switching device 23.

The switching device 23 can operate in the open state in response to a particular control signal from the power management module 24, thereby breaking a signal path between the card detect lines 16a' and 16b' and system advisory lines 25a and 25b. In the alternative, the switching device 23 can operate in the closed state in response to another control signal to maintain a signal connection between the card detect lines 16a' and 16b' and the system advisory line 25a and 25b. It will be appreciated that the switching device 23 can be implemented by an electronic switch, typically a field effect transistor (FET) or a bipolar transistor. Other types of electronic switches, however, can be used to implement the switching device 23, as is known in the art.

In response to the signals carried by the system advisory lines 25a and 25b, the device controller 18 can output a system interrupt request to a programmable interrupt controller (PIC) 30 via a signal line 28. In turn, the PIC 30 can generate a system interrupt in response to the system interrupt request. A processor 32 receives the system interrupt from the PIC 30 via a signal line 34. The system interrupt preferably has sufficient priority to cause the processor to halt processing tasks having less priority and to promptly respond to the system interrupt on the signal line 34. The system interrupt request on signal line 28 and the corresponding system interrupt on signal line 34 can be generated in response to signals on the system advisory lines 25a and 25b that represent a device insertion event or a device removal event.

The processor 32 responds to the system interrupt, which is associated with the system interrupt request generated by the device controller 18, by communicating with a handler 36 for the device controller 18. Typically, the handler 36 is implemented as an interrupt handler for the device controller 18. In response to a call from the processor 32, this interrupt handler can poll one or more registers of the device controller 18 to determine its present state. For example, the interrupt handler 36 can examine the present operating state of the device controller to develop an understanding of the circumstances associated with the generation of a system interrupt request by the device controller. If the interrupt request is associated with a current event for the device controller 18, such as a device removal or insertion event, the handler 36 communicates with card and socket services 38.

The card and socket services 38 represent layers of software that support the operation of the device 12 and the corresponding socket 14 within the computing environment of the computer 8. The socket services layer supports the operation of the socket 14, whereas the card services layer supports the operation of the device 12. In response to communications from the handler 36, the socket services forwards information to the card services. The card services maintains a registration record that defines the identity of each driver currently loaded for operation within the computer 8. In other words, loaded drivers, such as the driver 13, register with the card services when loaded for operation with the computer 8. Based on this registration information, the card services can determine which driver is associated with a combination of a device and a socket. In this manner, the card and socket services 38 can advise the driver 13, also called a device driver, about events affecting the operation of the device 12 (and its corresponding socket 14). For example, the card and socket services 38 can advise the driver 13 that its corresponding device has been removed from or inserted into a socket 14. This allows a device driver to respond to the event and to take the appropriate action.

The operating state of the switching device 23 determines whether the signal levels on the card detect lines 16a' and 16b' are carried to the corresponding system advisory lines 25a and 25b. In the event that the switching device 23 is set to the closed position, then the card detect lines 16a' and 16b' are electrically connected to the corresponding system advisory lines 25a and 25b. These signal connections, however, are broken when the switching device 23 transitions to the open position or state. By manipulating the operating state of the switching device 23, information regarding device insertion or removal events can be communicated to the card controller 18.

Similar to the card detect lines described above with respect to FIG. 1, the system advisory lines 25a and 25b float at the logical high level when a device 12 is not installed for operation in the socket 14. Pull-up resistors, which are typically located at the device controller 18 and connected between a voltage source and each system advisory line, operate to set the signal level at the device controller 18 to the logical high level when a device 12 has been removed from its corresponding socket 14. In contrast, upon insertion of the device 12 into the socket 14, the card detect lines 16a' and 16b' are set to the logical low level because the device/socket connection places a ground potential onto each card detect line. In other words, each card detect line 16a' and 16b' is grounded when the device 12 is properly inserted into the socket 14.

In the event that the switching device 23 is operating in the closed position, a device insertion event is recognized by the device controller 18 in response to both card detect lines 16a' and 16b' being set to the logical low level. A device removal event, however, is typically associated with a logical high level appearing on at least one of the system analysis lines 25a and 25b. A logical high level can be present on the system analysis lines 25a and 25b in response to (1) the switching device 23 operating in the open position or (2) the combination of the switching device 23 operating in the closed position and the device 12 is removed from the socket 14.

In response to a device insertion event, the driver 13 for the device 12 is advised of the insertion of that device and can communicate device configuration information. Likewise, upon removing the device 12 from the socket 14, a device removal event occurs and the driver 13 for the device 12 is advised of the removal of that device. In summary, the device driver loaded for operation with a corresponding device is preferably advised of a device insertion or removal event to support its operation with that device in the computer 8.

It is advantageous to advise the driver 13 for a corresponding device 12 of certain power management events, typically a power-up event or a power-down event. In the event of power interruption, it is often necessary to restore the configuration of the device by supplying device information via its driver. For example, the driver 13 can provide device configuration information to its device in response to a power-up event. It is useful to advise the driver of a power-down event, thereby notifying the driver of the present operating state of its corresponding device. Similar to a power-down event, power is removed from the socket 14 in response to a device removal event. Likewise, similar to a power-up event, electrical power is restored to the socket 14 in response to a device insertion event.

In view of the foregoing, it will be appreciated that the operations conducted for device removal and insertion events are similar to those required for certain power management events, namely a sequence of power-down and power-up events. Consequently, the device removal and insertion events can be adapted for power management applications to support the communication of power management events to the driver of a corresponding device. This can be accomplished by controlling the operating state or position of the switching device 23, which determines whether the signals on the card detect lines 16a' and 16b' are passed through the device controller 18 and communicated to the driver 13. Significantly, the device 12 remains connected to the socket 14 during manipulation of the operating state of the switching device 13 to support the power management operation.

By placing the switching device 23 in series with one or both of the card detect lines 16a' and 16b', the distribution of the signals carried by these card detect lines can be controlled in response to detection of a power management event. The power management module 24 is responsible for detecting power management events for the computer 8 and can output a control signal for controlling the state of the switching device 23 via the control line 26. In response to a power-down event, the power management module outputs a particular control signal to the switching device 24, thereby causing the switching device to enter the open state or position. This interrupts the passage of signals from the card detect lines 16a' and 16b' to the device controller 18, thereby tricking the device controller to take actions in response to the apparent removal of the device 12. Significantly, the device 12 remains inserted within the socket 14, thereby leading to the presence of logical lower levels signals on the card detect lines 16a' and 16b' that represent a device insertion event.

Because this pair of logical low level signals are interrupted by the open state of the switching device 23, the system advisory lines 25a and 25b float to the logical high level based on the connection of these lines to pull-up resistors at the controller 18. This logical high level is interpreted by the device controller 18 as a device removal event, thereby causing the driver 13 to be advised of the removal of power from the device 12. Typically, the device controller 18 can advise the device driver about the power transition by issuing a system advisory signal, which is handled by a processor of the computer. The distribution of power is removed from the device 12 via the socket 14, thereby accomplishing the power-down event. It will be appreciated that similar operations can be conducted for a device insertion event, as described in more detail below.

For a power-up event, the power management module 24 outputs another control signal to the switching device 23, thereby causing the switching device to enter the closed position and connecting both card detect lines 16a' and 16b' to the system advisory lines 25a and 25b. Again, the device 12 remains installed within the socket 14, thereby generating a logical low signal on the card detect lines 16a' and 16b'. This pair of logical low level signals are passed via the combination of the card detect lines 16a' and 16b', the switching device 23, and the system advisory lines 25a and 25b to the device controller 18. In response to this pair of logical low level signals, the device controller 18 responds as if the device 12 is inserted into the socket 14 following a prior removal of that device. This leads to the restoration of electrical power to the device 12 and the notification of the apparent device insertion event to the driver 13. Typically, the device controller 18 can advise the device driver about the power transition by issuing another system advisory signal. In response, the driver 13 can provide device configuration information to the device 12.

Figure 3:
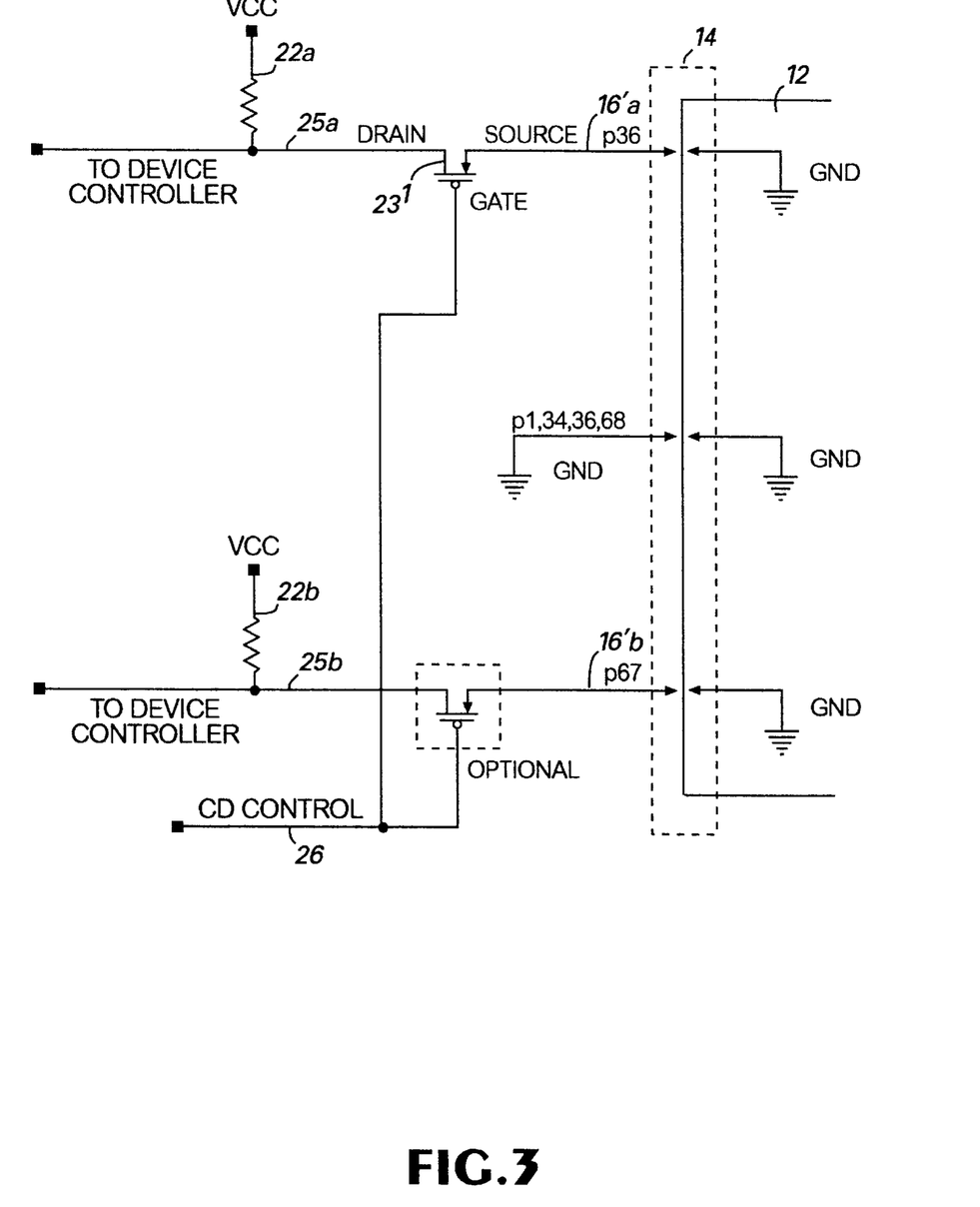
FIG. 3 is a schematic illustrating the circuitry for the preferred embodiment of the present invention.

FIG. 3 is a schematic diagram for the preferred embodiment of the present invention. Turning now to FIGS. 2 and 3, the switching device 23 is preferably implemented by a FET device 23' connected between either (1) the combination of the card detect line 16a and the system advisory line of 25a or (2) the combination of the card detect line 16b and the system advisory line 25b. The FET 23' serves to manipulate a signal control path between the socket 14 and the device controller 18, and a device removal event can be represented by deactivating the FET and opening this single path. Likewise, a device insertion event can be represented by activating the FET and closing this signal path (while the device 12 is properly installed within the socket 14 and a card detect line extends between the socket and the device controller). Although an optional second FET is shown in FIG. 3, it will be appreciated that the preferred embodiment only requires a single FET placed between one of the pair of card detect lines to achieve the desired manipulation of device removal/insertion signals.

For the FET 23' the source is connected to the card detect line 16a'(b), the drain is connected to the system advisory line 25a(b), and the gate is connected to the control line 26. The FET 23' is activated by a particular control signal on the controller 26, thereby causing the FET 23' to turn on and to provide a path between the drain and source. The active state of the FET 23' represents the normal operation for this switching device, thereby allowing the signals on the card detect lines 16a'(b) to pass to the system advisory line 25a(b). The FET 23', however, turns off in response to another control signal applied to the gate of the FET via the controlling 26. This interrupts the passage of signals from the card detect line 16a'(b) to the system advisory line 25a(b).

For normal operation of the computer 8, i.e., the absence of power consumption control, the switching device 23 remains in the closed position and the signals on the card detect lines 16a' and 16b' are communicated to the device controller 18. As is described above with respect to FIG. 1, these signals transition to a logical low level when a device is inserted into the socket and to a logical high level when a device is removed from this socket. Normal operation is accomplished by setting the control line 26 to a known logical level, thereby activating the FET 23' and providing a signal path between the drain and the source. This allows the signals on a card detect line to be passed from the source to the drain and thereafter to the controller 18. When the FET 23' operates in the closed position or state, the device insertion and removal events can be communicated to the controller 18 without interruption of the signal path between the device 12 and the controller 18.

In the event that the power management module elects to power-down the device 12 by removing power from the socket 14, the power management module 24 sends another control signal via the control line 26 to turn-off the FET 23'. For an n-channel FET, this alternative control signal is a logical low level. The application of this control signal to the gate causes the FET to turn-off and to interrupt the signal path between the source and the drain. Although the device 12 remains installed within the socket 14, this interruption of the signal path between the device 12 and the controller 18 causes the system advisory line 25a(b) to float to a logical high level. This effectively "tricks" the controller 18 into making a determination that the device 12 has been removed from the socket 14. Although the device 12 has not been removed, the controller 18 conducts operations as if the device had been removed from its socket based on the apparent device removal event.

In response to deactivating the FET 23', the system advisory line 25a (b) floats high and the controller 18 sends a system interrupt request via the signal line 28 to the PIC 30. The PIC 30 responds by sending a system interrupt to the processor 32 via the signal line 34. The CPU 32 communicates with the handler 36 for the controller 18. In turn, the handler 36 polls the controller 18 to determine if the interrupt is related to an event for the device 12. If so, the handler 36 communicates with the card and socket services 38 and, in response, the driver loaded for operation with the device 12 is advised of an apparent device removal event. In this event, the driver is advised that power has been removed from the socket 14 (and the device 12), which also serves to advise the driver about the power-down event.

If, on the other hand, the power management module 24 elects to return the device 12 to the power-up state, the power management module sends another control signal to the gate of the FET 23' via the control line 26, thereby activating this switching device. For example, for an n-channel FET, this control signal is a logical high level. By turning on the FET 23', the signal path between the source and the drain is completed and the card detect line 16a'(b) is connected to the corresponding system analysis line 25a(b). Although the device 12 remains installed within the socket 14, this completed signal path between the socket 14 and the controller 18 causes the system advisory line 25a(b) to transition from the logical high level to the logical low level. This effectively "tricks" the controller 18 into making a determination that the device 12 has been inserted into the socket 14. Although the device 12 has not been removed from the socket 14, the controller 18 responds to this apparent device insertion event by conducting operations as if the device had been newly inserted into its socket.

The controller 18 responds to this apparent device insertion event by sending a system interrupt request via the signal line 28 to the PIC 30. In response, the PIC 30 sends a system interrupt to the processor 32 via the signal line 34. The CPU 32 responds to the this priority interrupt by communicating with the handler 36, thereby causing the handler 36 to poll the controller 18 to determine if the interrupt is related to an event for the controlled device. If so, the handler 36 then communicates with the card and socket services 38 and, in response, the driver loaded for operation with the device 12 is advised of the apparent device insertion event. In this manner, the driver 13 is advised that power is restored to the socket 14 (and the device 12), which serves to advise the driver about the power-up event. The driver 13 can respond to this notice of an apparent device insertion event by supplying device configuration information to its device, thereby restoring device configuration.

Figure 4:
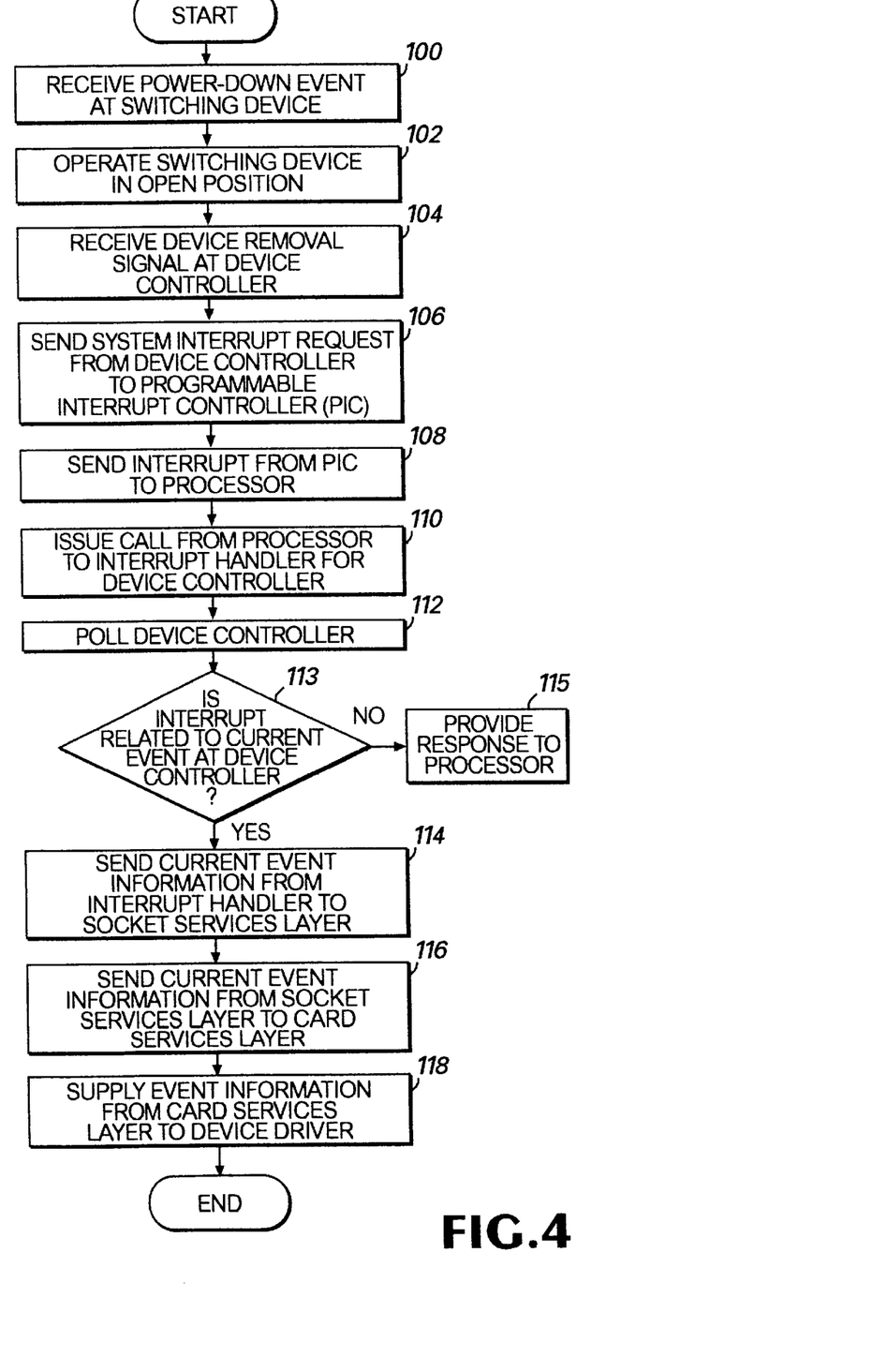
FIG. 4 is a logical flow diagram illustrating the steps of a method for managing electrical power of a removable device for a computer in response to a power-down event.
Figure 5:
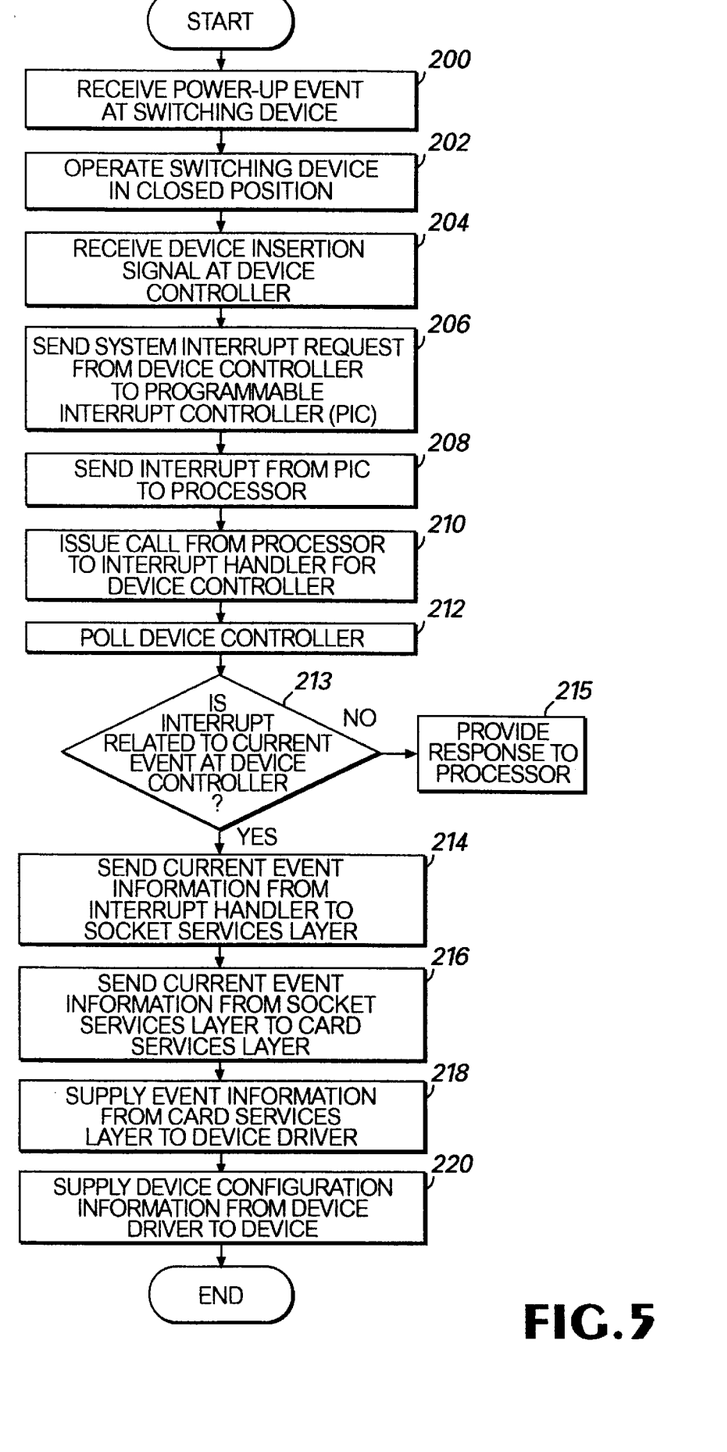
FIG. 5 is a logical flow diagram illustrating the steps for a method for managing electrical power removable device for a computer in response to a power-up event.

FIG. 4 is a logical flow diagram illustrating the preferred steps for a process of terminating the distribution of electrical power for a removable device, and FIG. 5 is a logical flow diagram illustrating the preferred steps for a process of restoring electrical power for a removable device. Turning first to FIGS. 2 and 4, the process begins at the START step in response to the implementation of a power management event by the power management module 24. In step 100, the power management module 24 outputs a control signal to the switching device 23. The state of this control signal corresponds to the type of power management event. To illustrate a power-down event in FIG. 4, the control signal applied to the switching device 23 represents a power-down event, which causes the switching device 23 to enter the open position and to interrupt the signal path between at least one card detect line 16a' and 16b' and a corresponding system analysis line 25a or 25b. By opening the signal path at the switching device 23, the system analysis line 25a(b) floats to the logical high level, thereby causing the controller 18 in step 104 to receive a device removal signal. This apparent device removal event causes the controller 18 at step 106 to generate a system interrupt request, which is forwarded to the PIC 30.

In step 108, the PIC 30 responds to the system interrupt request from the controller 18 by generating an interrupt signal. In step 110, the processor receives the interrupt signal and thereafter calls the handler 36 for the controller 18. In step 112, the handler 36 reads one or more registers of the controller 18 to determine if the interrupt is associated with an event for the device 12. This determination is conducted in the decision block 113. If the interrupt is associated with the device and its device controller 18, then the "YES" branch is followed to step 114. The handler 36, in step 114, responds to the communication with the controller 18 by sending event information to the card and socket services 38. Otherwise, the "NO" branch is followed from step 113 to step 115 and a response is provided to the processor.

In step 116, the socket services forwards the event to the card services. The card services, in turn, responds to the event information in step 118 by locating the driver loaded for operation with the device 12. The located device driver is then advised about the event, in this case, an apparent device removal event. In this manner, the device driver is advised about the power-down operation, which typically arises in response to a device removal event.

Turning now to FIGS. 2 and 5, the process begins at the START step in response to the implementation of a power management event by the power management module 24. In step 200, the power management module 24 outputs a control signal representing a power-up event to the switching device 23. For purposes of this discussion with respect to FIG. 5, this control signal causes the switching device 23 to enter the closed position and to complete the signal path between at least one card detect line 16a' and 16b' and a corresponding system analysis line 25a or b. By closing the signal path at the switching device 23, the system analysis line 25a or 25b transitions to the logical low level, thereby causing the controller 18 in step 204 to receive an apparent device insertion signal. The controller 18 responds to the detection of an apparent device insertion event by generating a system interrupt request at step 206, which is forwarded to the PIC 30.

In step 208, the PIC 30 responds to the system interrupt request from the controller 18 by generating an interrupt signal. In step 210, the processor receives the interrupt signal and thereafter calls the handler 36 for the controller 18. In step 212, the handler 36 reads one or more registers of the controller 18 to determine if the interrupt is associated with an event for the card 12. This determination is conducted in the decision block 213. If the interrupt is associated with the device and its device controller 18, then the "YES" branch is followed to step 214. The handler 36, in step 214, responds to the communication with the controller 18 by sending event information to the card and socket services 38. Otherwise, the "NO" branch is followed from step 213 to step 215 and a response is provided to the processor.

In step 216, the socket services forwards the event to the card services. The card services, in turn, responds to the event information in step 218 by locating the driver loaded for operation with the device 12. This device driver is then advised about the apparent device insertion event. In step 220, the driver responds to this communication by supplying device configuration information to its device.

In summary, the present invention provides a system for managing electrical power distributed to a removable device. A device removable signal is transmitted to a controller for the device in response to a power management event and while the device is installed within a socket of the computer. This device removable signal typically provides notice of a power state change for the device, such as the interruption of electrical power to that device. This power state change is communicated by the controller to the device driver in response to the device removal signal. In addition, power to the device is terminated in response to the power management event. A device insertion signal is transmitted to the controller in response to another power management event and while the device remains installed within the socket. This device insertion signal provides notice of another state change for the device. Electrical power is reapplied to the device in response to the other power management event. In addition, the device is configured by supplying device information from the device driver to the device in response to the device insertion signal and after electrical power is applied to the device.

It should be understood that the particular embodiments described herein have been disclosed by way of example and that other modifications may occur to those skilled in the art without departing from the scope and spirit of the appended claims.

I claim:

1. For a system comprising a socket capable of accepting a device, a controller for controlling the device, and a device driver for communicating with the device, wherein a device removal signal is normally generated in response to removing the device from the socket and a device insertion signal is normally generated in response to inserting the device into the socket, a method for managing electrical power distributed to the device, comprising the steps of:

sending the device removal signal to the controller in response to a first power management event and while the device is installed within the socket;

communicating a power state change from the controller to the device driver in response to the device removal signal;

terminating power to the device in response to the first power management event, by breaking a signal path between the socket and the controller;

sending the device insertion signal to the controller in response to a second power management event and while the device remains installed within the socket;

applying electrical power to the device in response to the second power management event;

configuring the device by supplying from the device driver a device configuration for the device in response to the device insertion signal and after electrical power is applied to the device.

2. The method of claim 1, wherein the first power management event is a power-down event and the second power management event is a power-up event.

3. The method of claim 1, wherein the step of breaking a signal path between the socket and the controller is performed by a switch connected between the socket and the controller.

4. The method of claim 1, wherein the first power management event and the second power management event are generated by a power management module.

5. For a system having at least one PCMCIA socket capable of accepting a PCMCIA device, wherein a device removal signal is normally generated in response to removing the PCMCIA device from the PCMCIA socket and a device insertion signal is normally generated in response to inserting the PCMCIA device into the PCMCIA socket, a method for managing electrical power distributed to the PCMCIA device, comprising the steps of:

sending the device removal signal to a controller of the PCMCIA socket in response to a first power management event and while the PCMCIA device is installed with the PCMCIA socket, the device removal signal providing an indication that power will be removed from the PCMCIA device;

sending a removal advisory signal from the controller to a device driver for the PCMCIA device in response to the device removal signal, the device driver responsive to the removal advisory signal to preserve device configuration information for the PCMCIA device;

terminating electrical power to the PCMCIA device in response to the first power management event, by breaking a signal path between the socket and the controller, wherein the PCMCIA device loses its device configuration in response to power termination;

sending the device insertion signal to the controller of the PCMCIA socket in response to a second power management event and while the PCMCIA device remains installed with the PCMCIA socket, the device insertion signal providing an indication that power will be applied to the PCMCIA device;

applying electrical power to the PCMCIA device in response to the second power management event;

sending an insertion advisory signal from the controller to the device driver for the PCMCIA device in response to the device insertion signal;

configuring the PCMCIA device by supplying the device configuration information to the PCMCIA device in response to the insertion advisory signal and after electrical power is applied to the PCMCIA device.

6. The method of claim 5, wherein the step of sending the device removal signal comprises:

receiving the first power management event;

responsive to the first power management event, opening one of a pair of card detect lines connected between the controller and the PCMCIA device, each card detect line normally set to a logical low level in response to insertion of the PCMCIA device into the socket and normally set to a logical high level in response to removal of the PCMCIA device from the socket, wherein opening at least one of the card detect lines while the PCMCIA device remains connected to the socket forces the card detect line to enter the logical high level and to generate the device removal signal.

7. The method of claim 5, wherein the first power management event is a power-down event and the second power management event is a power-up event.

8. The method of claim 5, wherein the step of breaking a signal path between the socket and the controller is performed by a switch connected between the socket and the controller.

9. The method of claim 5, wherein the first power management event and the second power management event are generated by a power management module.

10. A power management system for a computer-controlled device, comprising
at least one PCMCIA socket capable of accepting a PCMCIA device, wherein a device removal signal is normally generated by at least one card detect line in response to removing the PCMCIA device from the PCMCIA socket and a device insertion signal is normally generated by the at least one card detect line in response to inserting the PCMCIA device into the PCMCIA socket;
a controller, for controlling operations by the PCMCIA device;
a device driver for configuring the PCMCIA device for operation with the computer-controlled device;
a switching device, coupled between the controller and the socket, responsive to a first power management event, generated by a power management module, to enter an open state and to disconnect the socket from the controller even while the PCMCIA device is installed within the PCMCIA socket, thereby sending the device removal signal to the controller and providing an indication that power will be removed from the PCMCIA device,
the switching device, responsive to a second power management event, generated by the power management module, to enter the normally closed state and to connect the socket to the controller while the PCMCIA device is installed within the PCMCIA socket, thereby sending the device insertion signal to the controller and providing an indication that power will be distributed to the PCMCIA device;
the controller operative to (1) send a removal advisory signal to the device driver in response to the device removal signal and (2) to send an insertion advisory signal to the device driver in response to the device insertion signal;
the device driver operative to save the device configuration information for the PCMCIA device in response to the removal advisory signal and to configure the PCMCIA device by supplying the device configuration information to the PCMCIA device in response to the insertion advisory signal.

11. The power management system of claim 10, wherein the first power management event is a power-down event and the second power management event is a power-up event.

12. An improvement for a power management system of a computer-controlled device comprising at least one PCMCIA socket capable of accepting a PCMCIA device, wherein a device removal signal is normally generated by at least one card detect line in response to removing the PCMCIA device from the PCMCIA socket and a device insertion signal is normally generated by the at least one card detect line in response to inserting the PCMCIA device into the PCMCIA socket, a controller for controlling operations by the PCMCIA device, and a device driver for configuring the PCMCIA device for operation with the computer-controlled device, the controller operative to send a removal advisory signal to the device driver in response to the device removal signal and to send an insertion advisory signal to the device driver device in response to the device insertion signal, the device driver operative to save the device configuration information for the PCMCIA device in response to the removal advisory signal and to configure the PCMCIA device by supplying the device configuration information to the PCMCIA device in response to the insertion advisory signal the improvement comprising:
a switch, coupled between the controller and the socket, responsive to a first power management event, generated by a power management module, to enter an open state and to disconnect the socket from the controller even while the PCMCIA device is installed with the PCMCIA socket, thereby sending the device removal signal to the controller and causing the device driver to save the device configuration for the PCMCIA device prior to removal of power from the PCMCIA device;
the switch, responsive to a second power management event, generated by the power management module, to enter a closed state and to connect the socket to the controller while the PCMCIA device is installed with the PCMCIA socket, thereby sending the device insertion signal to the controller and causing the device driver to configure the PCMCIA device based on the stored device configuration after power is provided to the PCMCIA device.

13. The improvement for a power management system of claim 12, wherein the first power management event is a power-down event and the second power management event is a power-up event.

* * * * *